US007401196B2

(12) United States Patent
Mori et al.

(10) Patent No.: US 7,401,196 B2
(45) Date of Patent: Jul. 15, 2008

(54) STORAGE SYSTEM AND STORAGE CONTROL METHOD FOR ACCESS EXCLUSION CONTROL OF EACH STORAGE AREA UNIT COMPRISING STORAGE AREA OF STORAGE DEVICE (75) Inventors: Akihiro Mori, Odawara (JP); Kiyohisa Miyamoto, Hiratsuka (JP); Mamoru Sato, Odawara (JP)

(73) Assignee: Hitachi, Ltd., Tokyo (JP)

( * ) Notice: Subject to any disclaimer, the term of this patent is extended or adjusted under 35 U.S.C. 154(b) by 323 days.

(21) Appl. No.: 11/246,228

(22) Filed: Oct. 11, 2005

(65) Prior Publication Data
US 2007/0033359 A1    Feb. 8, 2007

(30) Foreign Application Priority Data
Aug. 5, 2005    (JP)    ............... 2005-228483

(51) Int. Cl.
G06F 12/00    (2006.01)
(52) U.S. Cl. .................. 711/163; 711/114; 711/162; 707/8; 707/204
(58) Field of Classification Search .................. 711/163
See application file for complete search history.

(56) References Cited

U.S. PATENT DOCUMENTS

| 5,940,841 | A  | * | 8/1999  | Schmuck et al. | ............ 707/205 |
| 6,493,804 | B1 | * | 12/2002 | Soltis et al.  | ................. 711/152 |
| 6,681,239 | B1 | * | 1/2004  | Munroe et al.  | .............. 718/104 |
| 6,751,617 | B1 | * | 6/2004  | Anfindsen      | ...................... 707/8 |
| 2004/0054866 | A1 | * | 3/2004 | Blumenau et al. | ........... 711/202 |

FOREIGN PATENT DOCUMENTS

JP    05-128002    11/1991

* cited by examiner

Primary Examiner—Donald Sparks
Assistant Examiner—Hashem Farrokh
(74) Attorney, Agent, or Firm—Reed Smith LLP; Stanley P. Fisher, Esq.; Juan Carlos A. Marquez, Esq.

(57) ABSTRACT

The lock construction portion of a storage system receives, from a host 101 or SVP, the number of hosts which is the number of hosts 101 actually connected to the storage system, and the number of groups which is the number of storage device groups among a plurality of storage device groups 301 for which access exclusion control must be performed. Based on the received number of hosts and number of groups, the lock construction portion controls for which storage device groups to provide control blocks, and the number of control sub-blocks to provide in different control blocks.

14 Claims, 8 Drawing Sheets

DURING STORAGE SYSTEM AND HOST OPERATION

STORAGE SYSTEM AND STORAGE CONTROL METHOD FOR ACCESS EXCLUSION CONTROL OF EACH STORAGE AREA UNIT COMPRISING STORAGE AREA OF STORAGE DEVICE

CROSS-REFERENCE TO PRIOR APPLICATION

This application relates to and claims priority from Japanese Patent Application No. 2005-228483, filed on Aug. 5, 2005, the entire disclosure of which is incorporated herein by reference.

BACKGROUND OF THE INVENTION

1. Field of the Invention

The present invention relates to storage control technology, and in particular to control of access exclusion.

2. Description of the Related Art

In for example a database system which handles large amounts of data, such as for example a data center, data is managed using a storage system configured separately from host computers. This storage system is for example a disk array system such as a RAID (Redundant Array of Independent Inexpensive Disks) system, configured with numerous storage devices arranged in an array.

One such a storage system is, for example, the magnetic disk subsystem disclosed in Japanese Patent Laid-open No. 5-128002. This subsystem has cache memory 28, a control table 30, and a plurality of magnetic disk devices 24 to 27. The cache memory 28 is divided into a plurality of areas 28A, 28B by tasks processed by host computers 22, 23. The control table 30 is divided into a plurality of control tables 30A, 30B corresponding to the plurality of areas 28A, 28B. The host computers 22, 23 specify, for each area 28A, 28B, the magnetic disk devices 24 to 27.

SUMMARY OF THE INVENTION

For example, in a large-scale computer system, a host computer group comprising a plurality of host computers (hereafter simply called "hosts"), and a storage system group comprising a plurality of storage systems, are provided. Each of the storage systems comprises a plurality of logical storage devices (hereafter simply called "LDEVs"), provided by the storage resources of a plurality of physical storage devices (for example, hard disk drives). The storage area of each LDEV comprises a plurality of storage area units (hereafter called "records").

In this computer system, there is the possibility that a plurality of hosts may access the same LDEV. In this case, it is possible that, before a certain host reads data from a certain record, the data may be updated by a different host. Under such circumstances, coherency of records cannot be maintained.

One conceivable method to maintain the coherency of each record is to provide a control block having a plurality of control sub-blocks to control access exclusion for each record, and use this control block to control access exclusion for each record. Specifically, when a request to access a certain record is received from a certain host, the control block assigned to that record is put into a state of use, and thereafter, even if a request to access the record is received from another host, access by another host is not permitted until the control block is returned to the unused state.

However, normally there are a huge number of records. For example, within a storage system there are probably records which are not accessed by any host, and there are probably records for which the need for access exclusion control may not arise. Hence if some modification is not made to the method of access exclusion control, then storage resources for storing control blocks may be consumed wastefully.

An object of this invention is to prevent the wasteful consumption of storage resources which store the control block.

Further objects of the invention will become clear in the subsequent explanation.

A storage system according to this invention comprises a plurality of storage device groups (for example, CUs, described below) having a storage area consisting of a plurality of storage area units; a control block group (for example, a logical lock structure group, described below), used for control of exclusion of access of each storage area unit (for example records, described below) by the plurality of host computers; a storage resource (for example shared memory, described below), capable of storing the control blocks; and a controller, which performs the exclusion control using the control block group. Each of the plurality of storage device groups comprises one or more storage devices (for example a LDEV, described below). The control block group comprises one or more control blocks (for example a logical lock structure, described below). Each of the control blocks has a plurality of control sub-blocks (for example a lock table, described below) to perform control of exclusion of access of one storage area unit, corresponding to one among the plurality of storage device groups. The controller ascertains the number of hosts, which is the number of host computers actually able to access the same storage area unit, and/or the number of groups, which is the number of storage device groups requiring the exclusion control among the plurality of storage device groups; and based on the ascertaining number of hosts and/or number of groups, the control block group is constructed. Specifically, for example, based on the ascertained number of hosts and/or number of groups, the controller controls which control blocks to provide for which storage device groups, and how many control sub-blocks to provide for which control blocks.

The above ascertaining can be performed by, for example, ascertaining means. Construction can be performed by, for example, constructing means. The controller can be configured from ascertaining means and constructing means. The above ascertaining and constructing may be performed by a processor which for example reads a prescribed computer program from a certain storage area, and executes the program (similarly for operations performed by each of the following means).

According to a first aspect of the invention, the controller can have a control interface which accepts input of the number of hosts and/or number of groups from at least one host computer among the plurality of host computers, or from another computer machine connected to the storage system. The controller, by accepting input of the number of hosts and/or number of groups from the control interface, can ascertain the number of hosts and/or number of groups.

According to a second aspect of the invention, in the first aspect the greater the number of hosts for which access exclusion control is performed using the sub-blocks, the larger is the size of the control sub-blocks. The controller can compute (using for example computation means) the number of control sub-blocks which can be stored in an area for storage of the control block group in the storage resource, based on the ascertained number of hosts and the size of the area. Further, the controller can notify the host computers and/or another computer machine of the computed number (for example using notification means).

According to a third aspect of the invention, in the first aspect the greater the number of hosts for which access exclusion control is performed using control sub-blocks, the larger is the size of the control sub-blocks. The controller can compute (using for example first computation means) a first number of control sub-blocks which can be stored in an area for storing the control sub-block group in the storage resource, based on the ascertained number of hosts and the size of the area. Further, the controller can compute (using for example second computation means) a second number of control sub-blocks comprised by the control block corresponding to each storage device group for which the exclusion control must be performed, based on the computed first number and the ascertained number of groups. Further, the controller can notify the host computers and/or another computer machine of the computed second number (using for example notification means).

According to a fourth aspect of this invention, the controller can ascertain for which storage groups the exclusion control should be performed (using for example another ascertaining means). Further, when constructing the control block group, the controller can equalize the numbers of control sub-blocks comprised by control blocks corresponding to each of the ascertained storage device groups.

According to a fifth aspect of this invention, the controller can ascertain (using for example another ascertaining means) for which storage device groups the exclusion control must be performed, and what number of control sub-blocks should be allocated to which storage control groups. In constructing the control block group, the controller can use the ascertained number of control sub-blocks to configure control blocks corresponding to each of the ascertained storage device groups.

According to a sixth aspect of this invention, in the first aspect, the controller, upon receiving an access request for a certain storage area unit in a certain storage device group, searches control sub-blocks in the unused state from the control block corresponding to the storage device group, sets the retrieved control sub-block to the used state, and when processing of the access request is completed, can return the control sub-block to the unused state (using for example access means). The controller ascertains the block usage circumstances which are the number of control sub-blocks in the unused state in each control block (using for example usage circumstance ascertaining means), and can notify the host computers or the other computer machine of the ascertained block usage circumstances (using for example notification means).

When configuration of the control block group is completed, the storage system can notify the host computers of the configuration of the constructed control block group and can provide a prescribed completion report. Upon receiving the configuration of the control block group and the completion report, the host computers can execute startup processing and can begin operation.

DESCRIPTION OF THE PREFERRED EMBODIMENTS

Figure 1:
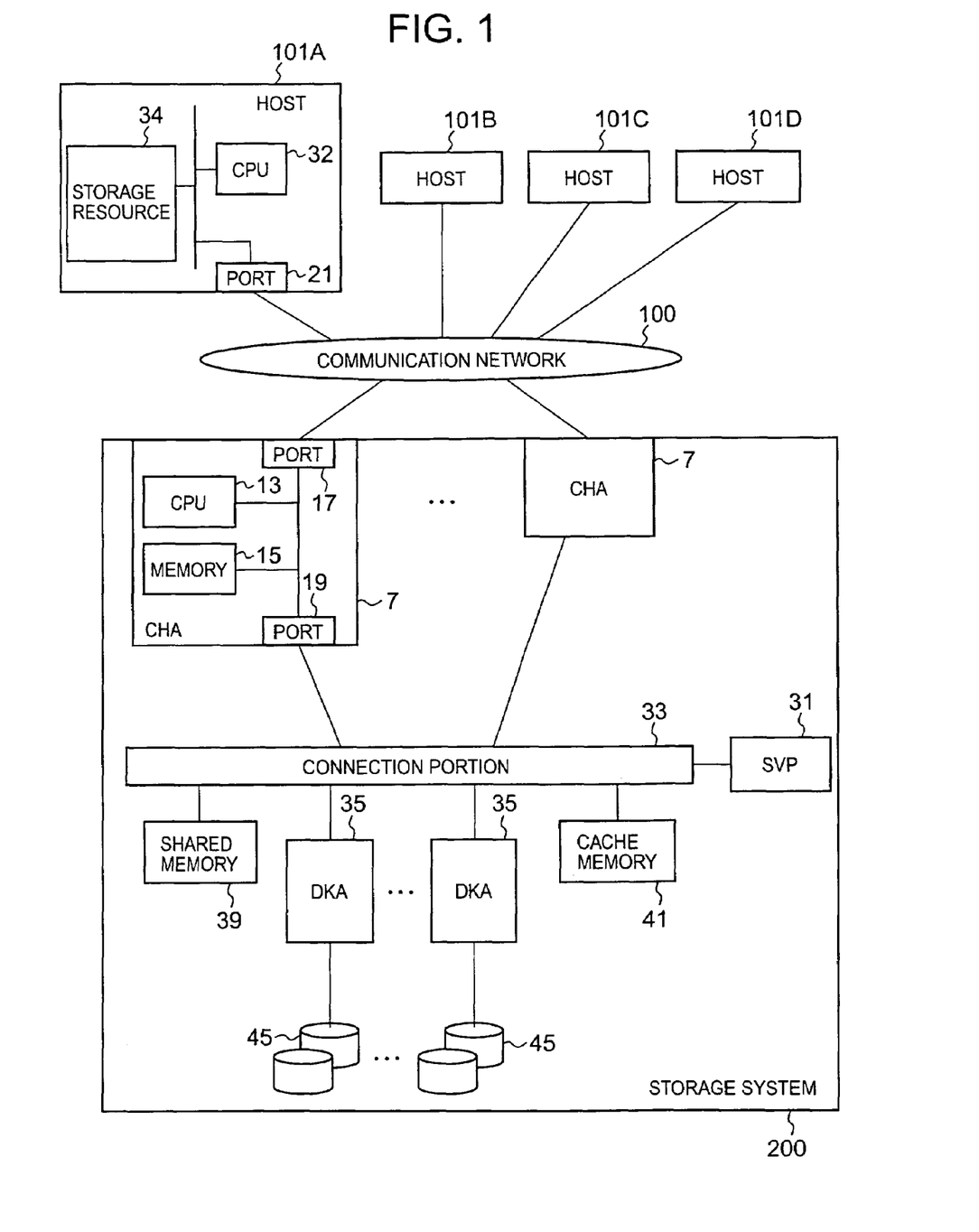
FIG. 1 shows in summary the hardware configuration of a computer system comprising the storage system of one aspect of the invention.

FIG. 1 shows in summary the hardware configuration of a computer system comprising the storage system of one aspect of the invention. In the following explanation, when differentiating and explaining the same type of constituent components, a combination of parent numbers (for example 101) and child symbols (for example A, B, C, or D) is used for differentiation; when there is no particular need for differentiation, parent numbers alone may be used.

A computer system of this aspect can for example be used as a transaction system for primary tasks. For example, a plurality of (for example four) host computers (hereafter simply called "hosts") 101A to 101D, and one or more (for example, one) storage system 200, are connected to a communication network 100.

Any of the plurality of hosts 101A to 101D may be a mainframe computer, or may be an open-system computer. Each host 101 can be for example a personal computer, a server, or a workstation. Each host 101 can comprise storage resources 34 (for example memory and a main storage device) capable of storing electronic information such as data, computer programs and similar, a CPU 32 which controls operation of the host, a communication port 21 or similar for connection to the communication network 100, and other hardware resources, as shown in representative fashion by 101A.

The storage system 200 comprises, for example, a plurality of CHAs (channel adapters) 7, a plurality of DKAs (disk adapters) 35, cache memory 41, shared memory 39, a connection portion 33, a plurality of physical storage devices (for example hard disk drives) 45, and a SVP (service processor) 31.

The CHAs 7 are interface control boards which perform processing for data input to and output from storage devices 45 (access such as writing and reading). A CHA 7 comprises, for example, a communication port 17 for connection to the communication network 100, a CPU 13, memory 15, a communication port 19 for connection to the connection portion 33, and other hardware resources.

The DKAs 35 are used to send data to and receive data from storage devices 45. A DKA 35 is configured as a type of interface control board comprising a CPU, memory, and similar. The hardware configuration of the DKAs 35 can be made the same as that of the CHAs 7.

The cache memory 41 is for example volatile or nonvolatile memory, and can temporarily store data received from hosts 101A to 101D and data read from storage devices 45.

The shared memory 39 is for example nonvolatile memory, and stores control information relating to data exchanged with hosts 101 (for example, information indicating which data is to be stored in which cache area secured in cache memory 41) and similar. In the example shown, the cache memory 41 and shared memory 39 are physically separated, but may be configured as a single memory device. In this case, the memory space in the memory may be logically divided into a space for cache memory and a space for shared memory.

The connection portion 33 comprises a first sub-connection portion for interconnection between CHAs 7, DKAs 35, cache memory 41, and shared memory 39 (for example, an ultra-high speed crossover switch which performs data transfer through high-speed switching operation), and a second sub-connection portion for connection of the SVP 31 to the CHAs 7, DKAs 35, cache memory 41, and shared memory 120 in a manner enabling communication (for example, a LAN (Local Area Network)).

The SVP 31 is a device which can access the CHAs 7, DKAs 35, cache memory 41, and shared memory 39. Specifically, for example, the SVP 31 is a terminal used for maintenance, and can comprise an input device (such as a keyboard or mouse) operated by a manager, a control device (for example a motherboard provided with a CPU or similar) which executes processing according to operations by a manager, and a display device (for example, a display screen) which displays information set in shared memory 39 or similar. The SVP 31 may be provided in the storage system 200, or may be provided remotely via a LAN or other communication network. The functions of the SVP 31 are provided in at least one host 101, and this host 101 may control the storage system 200 as the SVP 31.

In such a computer system, data input to and output from storage devices 45 can be performed according to the following flow.

For example, when a data read request is issued by a host 101A, a CHA 7 receives the read request, and can transmit the received read request to a DKA 35. The DKA 35 can receive the read request, read data from a storage device 45 according to the request, and write the read data to cache memory 41. The CHA 7 can read the data written to cache memory 41, and can transmit the read data to the host 101A.

When for example a data write request is issued by the host 101A, a CHA 7 can receive the write request and data and transmit the received write request to a DKA 35, and can write the received data to cache memory 41. The DKA 35 can receive the write request, read data from cache memory 41 according to the request, and write the read data to a storage device 45.

The above is a summary of a computer system of this aspect. Below, the principal portions of this aspect are explained, referring to FIG. 2 and subsequent drawings.

Figure 2:
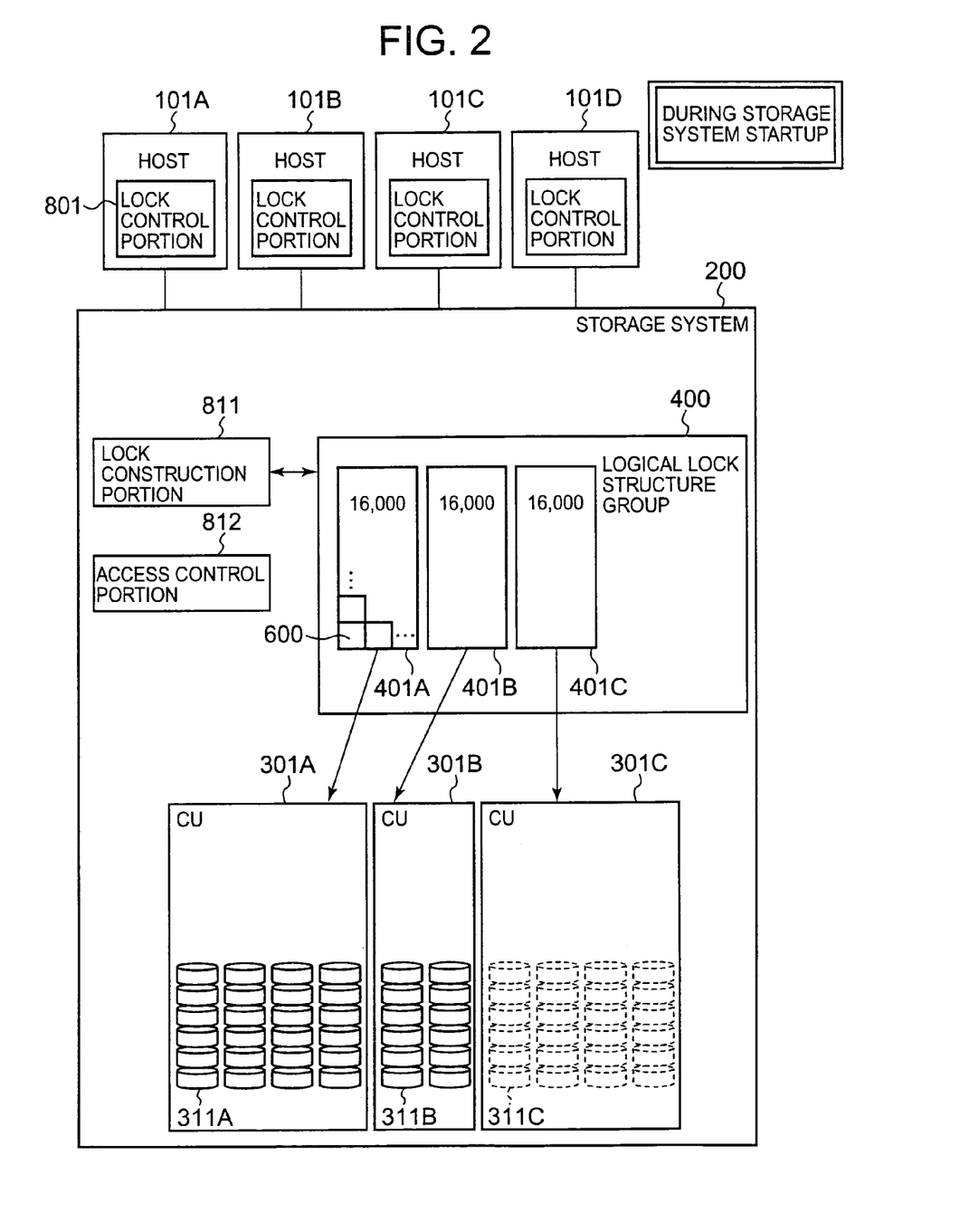
FIG. 2 shows the functional blocks of the computer system of an aspect, and in particular shows the computer system at a certain time during operation of the storage system 200.

FIG. 2 shows functional blocks in a computer system of this aspect, and in particular shows the computer system at a certain time during operation of the storage system 200.

Each host 101 comprises a lock management portion 801, and the storage system 200 comprises a lock construction portion 811 and an access control portion 812. The lock management portion 801 and lock construction portion 811 can be provided in the form of control programs having functions to send and receive information relating to logical lock structures, described below, between the host 101 and the storage system 200. The access control portion 812 is a computer program to perform access control based on a lock table in the logical lock structure. The lock management portion 801 is for example read from the storage resource 34 of the host 101 into the CPU 32 and executed. The lock construction portion 811 and access control portion 812 are for example read from memory 15 into the CPU 13 of a CHA 7 and executed.

The storage system 200 comprises one or more logical control units (hereafter simply "CUs") 301, comprising a plurality of LDEVs (for example, a maximum of 256) 311. An LDEV 311 is a logical storage device, provided on a physical storage device 45. Each CU 301 can be recognized by each host 101 as one LDEV group. In this aspect, for example, a CU 301A has a large number of online LDEVs 311A, a CU 301B has a small number of online LDEVs 311B, and a CU 301C has a large number of offline LDEVs 311C which are copy destinations of each of the LDEVs 311A of the CU 301A. Among the CUs 301A to 301C, the CU 301A and CU 301B are recognized by two or more of the hosts 101A to 101D, but the CU 301C is not recognized by any of the hosts 101A to 101D (and therefore the LDEVs 311A and 311B are shown by solid lines, and the LDEV 311C is shown by a dotted line).

The lock construction portion 811 can construction a logical lock structure group 400 at a certain time during operation of the storage system 200 (for example, during operation of the CHA 7). Specifically, the lock construction portion 811 can construct, on a storage resource (such as shared memory 39) which can be accessed by each CHA 7, a plurality of logical lock structures 401A to 401C corresponding to the respective plurality of CUs 301A to 301C, according to prescribed initial settings (for example, default settings). A logical lock structure 401 controls exclusion of access to records within the CU corresponding to the structure 401. Each of the logical lock structures 401 constructed at this time comprises a predetermined number of (for example, 16,000) lock tables 600. A lock table 600 controls access exclusion (also in some cases called "logical locks") to records within the CU 301 corresponding to the logical lock structure 401 of the lock table 600. A lock table 600 is not allocated to a prescribed record, but is dynamically allocated and released. For example, during operation of the storage system 200, a lock table 600 is allocated in response to a lock request from a host 101, and after the access ends (upon completion of data writing or reading), is released. The access control portion 812 can control logical locks of a certain record for each host 101 by using the logical lock structure 401 for the CU 301 having that record (an example of the specific flow of logical lock control is explained in detail below, referring to FIG. 5A and FIG. 5B).

In this aspect, at a certain time during operation of the storage system 200, a logical lock structure 401 having a prescribed number of lock tables 600 is constructed uniformly in each of the CUs 301, regardless of the number of hosts 101 connected to the storage system 200 or whether the CU 301 is used. In this state, each of the hosts 101 and the storage system 200 can be operated to perform prescribed tasks without performing re-construction processing, described below, of the logical lock structure group 400.

However, in this case the following problem may arise.

There are cases in which LDEVs recognized by two or more hosts 101 (for example, online LDEVS 311A, 311B, and LDEVs not recognized by two or more hosts 101 (for example, offline LDEVS) 311C, coexist in the storage system 200. Data in the latter LDEV 311C is never updated by two or more hosts 101. If, despite this fact, a logical lock structure 401 is prepared for the entire CU 301, then because of the logical lock structure 401 which is not used, storage resources in the storage system 200 are needlessly consumed.

Further, suppose that the maximum number of connectable hosts is stipulated in a certain transaction system. In this case, each lock table 600 is constructed so as to enable control to exclude access by the maximum number of hosts. However, when the number of hosts 101 actually connected is smaller than the above maximum number, lock tables 600 are constructed which are needlessly large in size. This is a still more serious problem when there are requests to increase the number of lock tables 600.

For the above reasons, it is desirable that prior to operation of the hosts 101 and storage system 200, processing be performed to re-construct the logical lock structure group, as explained below.

Figure 3:
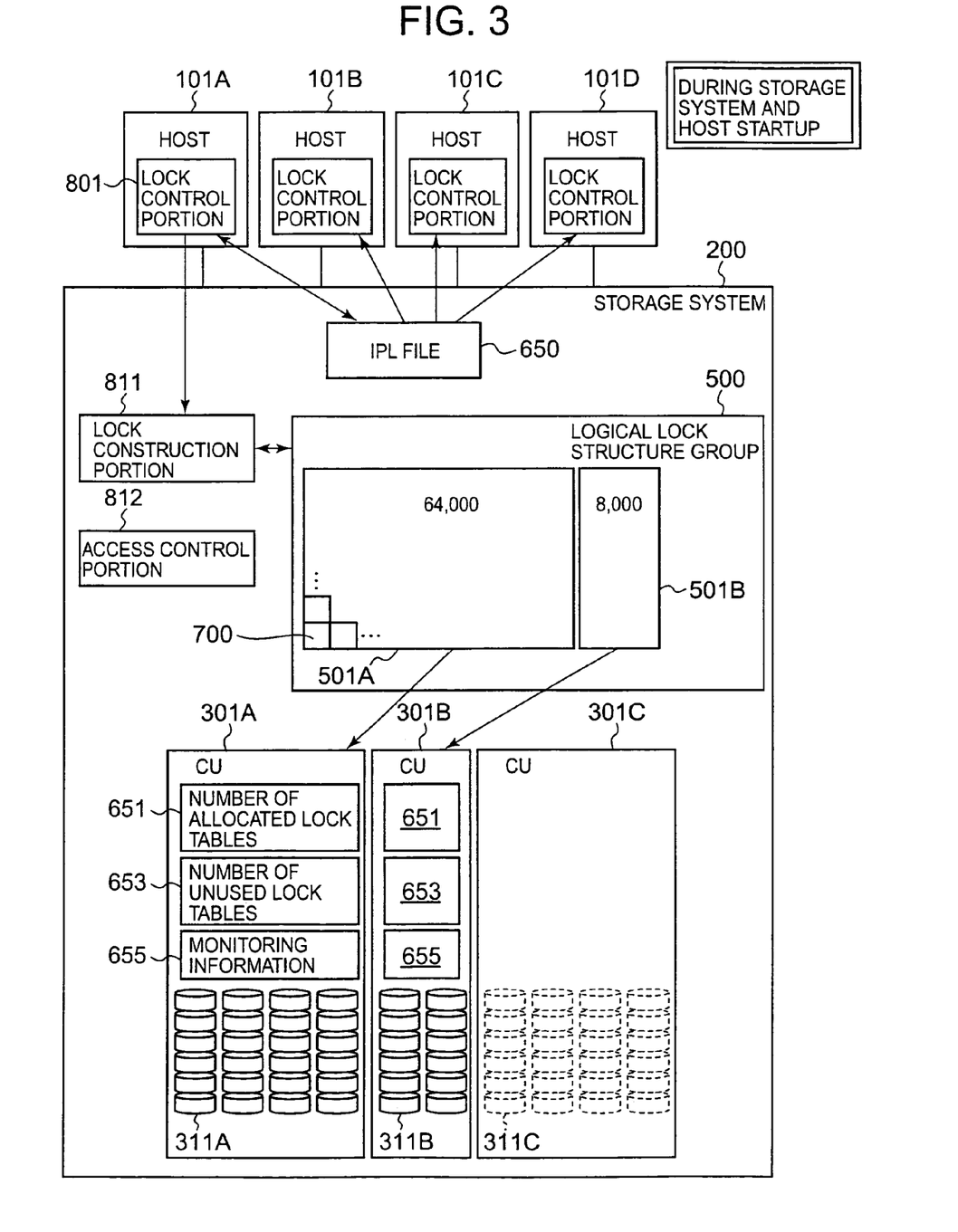
FIG. 3 explains the re-construction processing of a logical lock structure group.

FIG. 3 explains the re-construction processing of a logical lock structure group.

The lock control portion 801 of a certain host 101A transmits to the lock construction portion 811 a host setting command and host setting parameter, explained below.

Figure 4A:
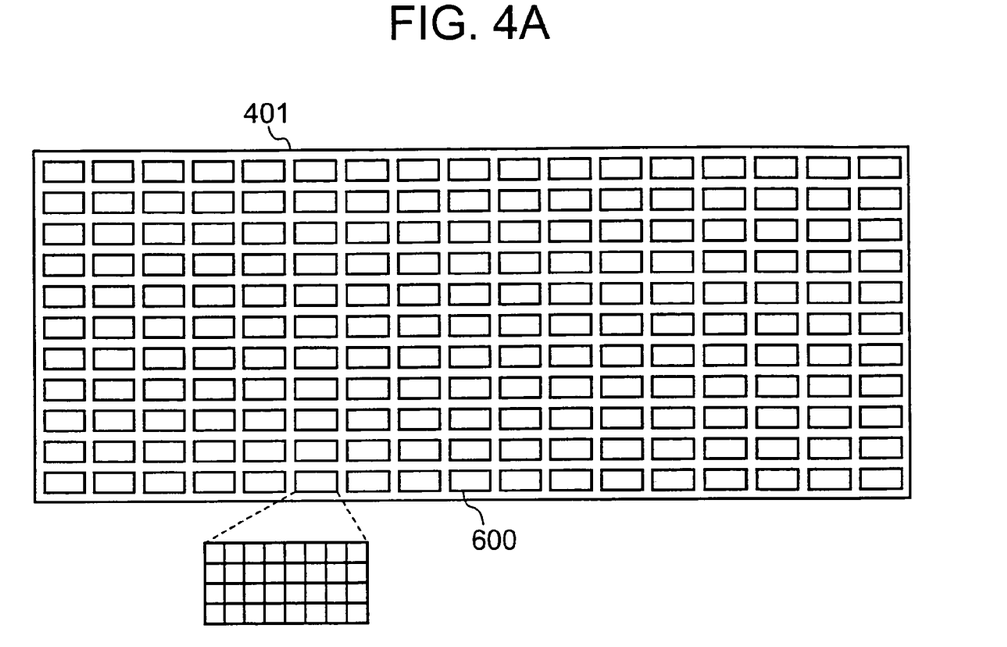
FIG. 4A shows an example of the configuration of a certain logical lock structure 401 and lock table 600 prior to re-construction processing.
Figure 4B:
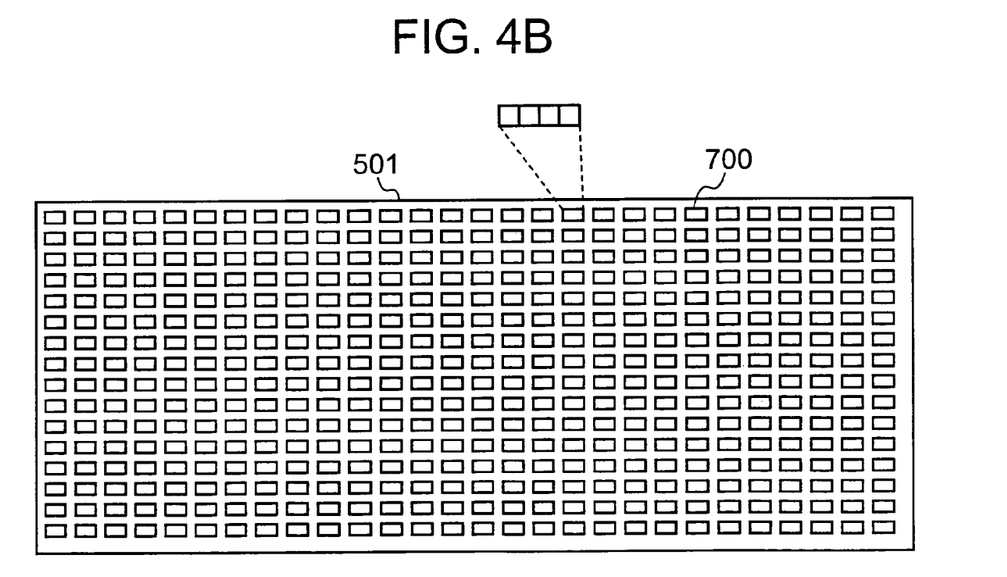
FIG. 4B shows an example of the configuration of a certain logical lock structure 501 and lock table 700 after re-construction processing.

The lock construction portion 811 receives the host setting command and host setting parameter, and re-constructs the logical lock structure group according to the host setting command and host setting parameter. As a result, for example, the logical lock structure group 500 has the logical lock structures 501A and 501B. Specifically, for example, the LDEV 311C in the CU 301C is never accessed by two or more hosts 101; in other words, there is no need to perform access exclusion control, and so the logical lock structure corresponding to the CU 301C is deleted. Further, the number of LDEVs (put another way, the number of records) 311A existing in the CU 301A is greater than the number of LDEVs 311B existing in the CU 301B, and so the number of lock tables 700 (for example, 64,000) forming the logical lock structure 501A corresponding to the CU 301A is made greater than the number of lock tables 700 (for example, 8,000) forming the logical lock structure 501B corresponding to the CU 301B. Also, the sizes of each of the lock tables 700 are made smaller than the sizes of the lock tables 600 constructed prior to the re-construction. For example, as shown in the example of FIG. 4A, a lock table 600 constructed before the re-construction was constructed for a maximum of 32 hosts; but a lock table 700 after re-construction is constructed based on the actual number of four connected hosts, as shown in the example of FIG. 4B. Hence, for example in a case in which the size of a logical lock structure 401 before re-construction processing and the size of the logical lock structure 501 after re-construction processing is the same, the logical lock structure after re-construction processing 501 can comprise a greater number of lock tables 700, as shown in FIG. 4A and FIG. 4B.

The lock construction portion 811 can update the number of allocated lock tables 651 prepared for each CU 301 and the number of unused lock tables 653 based on the logical lock structure group 500 after re-construction (in FIG. 3, reference numbers are assigned within the blocks for the CU 301B). However, because no logical lock structure is prepared for the CU 301C, a number of allocated lock tables 651, number of unused lock tables 653, and minimum unused number 655, described below, are not prepared. The number of allocated lock tables 651, number of unused lock tables 653, and minimum unused number 655 are data stored in a storage resource (for example shared memory 39) of the storage system 200. The number of allocated lock tables 651 indicates the number of lock tables comprised by the logical lock structure 501 corresponding to the corresponding CU 301. The number of unused lock tables 653 indicates the number of lock tables in the unused state within the logical lock structure 501 (hence, when none of the lock tables 700 are being used (for example, in the initial state), the number is the same as the number of allocated lock tables 651). The minimum unused number 655 is information indicating the minimum value of the number of unused lock tables 653 during operation of the storage system 200.

The lock control portion 801 of the host 101A, upon recognizing that the logical lock structure group has been re-constructed according to the host setting command and host setting parameter, can write the configuration relating to the logical lock structure group 500 after re-construction (for example, the number of lock tables existing in the logical lock structure corresponding to a CU 301, and similar) to an IPL (Initial Program Loader) file 650. The IPL file 650 is a file read into the CPU 32 of each host 101 upon startup of the host 101. Each host 101 is started based on information written to this IPL file 650, and by this means can recognize the configuration of the logical lock structure group 500. The IPL file 650 can for example be provided to each host 101 using various methods. In this aspect, for example, the lock control portion 801 of the host 101A writes the updated IPL file 650 to a system LDEV not shown, and the other hosts 101B to 101D read the IPL file 650 from this system LDEV.

When startup of the hosts 101 and storage system 200 ends and operation begins, the following access exclusion control can be executed. Specific details are explained below.

Figure 5A:
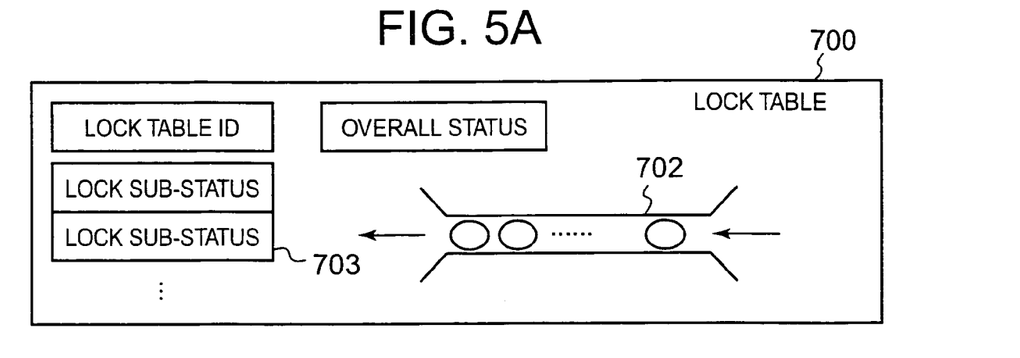
FIG. 5A shows an example of the configuration of a lock table 700.

FIG. 5A shows an example of the configuration of a lock table 700.

A lock table 700 has, for example, an overall status, a lock table ID, a lock sub-status 703, and a queue 702. The overall status is a status indicating the state, whether used or unused, of the lock table 700. The lock table ID is an ID provided when the overall status is the unused state, and for example indicates to which record the lock table 700 is assigned. The lock sub-status 703 corresponds to one host 701, and indicates the status relating to that host 701 (for example, unused, in use, or waiting release). The smaller the number of connected hosts, the smaller is the number of lock sub-statuses 703, and so the smaller is the size of the lock table 700. The queue 702 is used to accumulate lock requests from hosts 101.

FIG. 5B shows an example of the flow of access exclusion control.

Figure 5B:
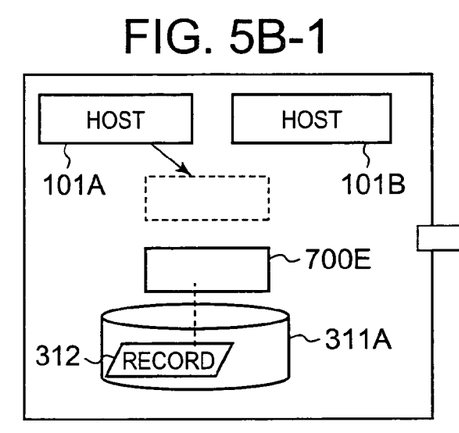
FIG. 5B shows an example of the flow of access exclusion control.

For example, as shown in FIG. 5B-1, a host 101 may issue, to the storage system 200, a lock request for a certain record 312 in a certain LDEV 311A in the CU 301A. Here, no lock table 700 has as yet been assigned to the record 312.

Figure 5B:
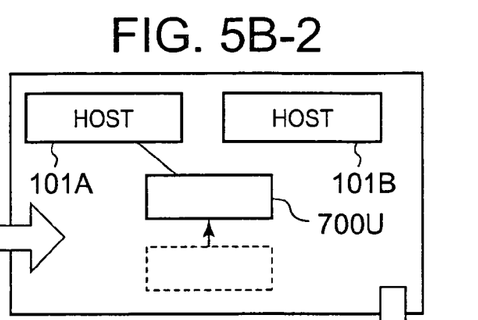

In this case, the access control portion 812 (see for example FIG. 3) searches for a lock table 700E represented by the overall status as being in the unused state from among the logical lock structure 701A corresponding to the CU 301A, provides a lock table ID signifying assignment to the record 312 to the lock table 700E, and changes the overall status for the table 700E to the used state, as indicated in the example of FIG. 5B-2. By this means, a lock table 700E in the unused state becomes a lock table 700U in the used state, assigned to the record 312.

Figure 5B:
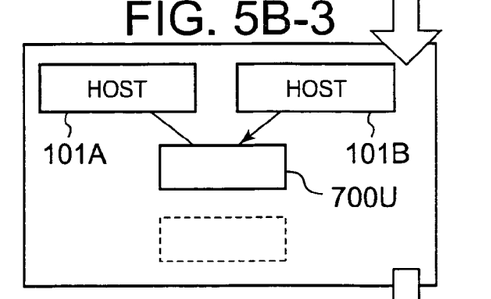

When in this state, the record 312 can be accessed by the host 101A. In this state, for example, even upon receiving a lock request for the same record 312 from another host 101B, the access control portion 812 does not permit access by the host 101B, but causes the host 101B to await release, as shown in FIG. 5B-3.

Figure 5B:
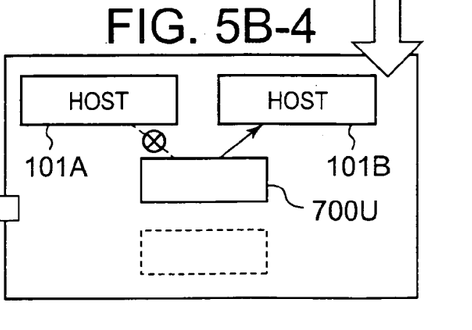
Figure 5B:
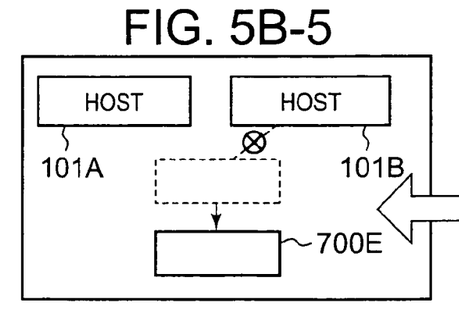

Thereafter, as shown in FIG. 5B-4, when access by the host 101A of the record 312 is completed (for example, when an unlock request is received from the host 101A), the access control portion 812 releases the lock table 700U for the hosts 101, notifies the host 101B which is awaiting release of the logical lock completion, and accepts access.

Then, as shown in FIG. 5B-5, if access of the record 312 by the host 101B is completed, and moreover the sub-status 703 for all hosts 101 is not in use, the access control portion 812 releases the lock table 700U, changing the table to a lock table 700E in the unused state.

Through the above flow of processing, access exclusion control is performed. In this access exclusion control, when there exist no lock tables 700E in the unused state at all in the logical lock structure 701, the logical lock of a record in the CU 301 corresponding to the logical lock structure 701 waits until a lock table 700E in the unlocked state appears. Consequently there is a wait for access of the record.

Hence when the frequency of access of for example CU 301A is greater than the frequency of access for CU 301B, it is preferable to make the number of lock tables 700 comprised by the logical lock structure 701A greater than the number of tables 700 comprised by the logical lock structure 701B, as shown in FIG. 3. As shown in FIG. 2, when a logical lock structure group 400 is constructed according to the initial settings, it is preferable that the logical lock structure group be re-constructed, as shown in FIG. 3.

Below, an example of the flow of processing to re-construct a logical lock structure group is explained, referring to FIG. 6. A lock control portion 801 may be provided in the SVP 31 as well, and the re-construction processing performed between this lock control portion 801 and the lock construction portion 811 in the storage system 200. However, here it is assumed that the re-construction processing is performed between the lock control portion 801 in a host 101 and the lock construction portion 811 in the storage system 200.

As a command used to send and receive information relating to the logical lock structure group between the host 101 and the storage system 200, there are for example two types of command, which are the host setting command indicated by the arrow 820 and the host read command indicated by the arrow 830. In this aspect, the lock control portion 801 issues commands to the storage system 200 in the order of a host setting command 820 and a host read command 830, in order to perform the re-construction processing.

More specifically, for example, during operation of the storage system 200 the lock construction portion 811 constructs a logical lock structure group 400 according to prescribed initial settings (step S150).

Figure 7A:
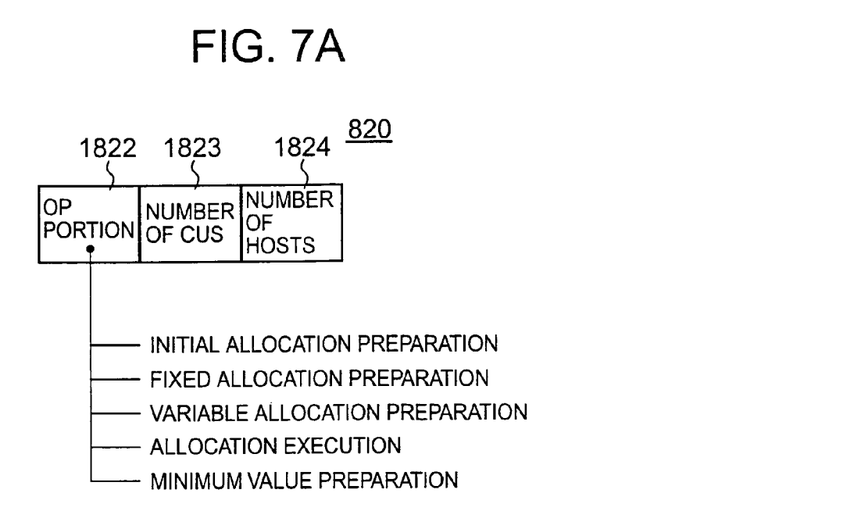
FIG. 7A shows an example of the configuration of a host setting command 820.

The lock control portion 801 transmits a host setting command 820, configured as shown in the example of FIG. 7A, to the storage system 200 with arbitrary timing (for example, upon receiving a prescribed request from a user of the host 101). The host setting command 820 comprises, for example, an operation (OP) portion field 1822, number of CUs field 1823, and number of hosts field 1824. The OP portion field 1822 describes information indicating whether the storage system 200 is to perform some action. This information may be, for example, initial allocation preparation, indicating a request for a logical lock structure group 400 constructed according to initial settings; fixed allocation preparation, indicating that the number of lock tables in all logical lock structures is to be set to a prescribed value during re-construction processing; variable allocation preparation, indicating that the number of lock tables in each logical lock structure is to be set to a user-arbitrary value during re-construction processing; allocation execution, indicating a request to execute allocation; and minimum value preparation, requesting a minimum unused number for each logical lock structure. Information indicating the number of CUs 301 provided within the storage system 200 appears in the number of CUs field 1823. Information indicating the number of hosts 101 connected to the storage system 200 appears in the number of hosts field 1824.

The lock construction portion 811, while receiving host setting commands 820, can compute the total number of lock tables n1 (number of lock tables comprised by the logical lock structure group) which can be saved in the storage resources (for example shared memory 39) of the storage system 200, based on the number of hosts as described in the number of hosts field 1824, and can compute the number of lock tables n2 in one logical lock structure, based on the number of CUs as described in the number of CUs field 1823 (S150). The lock construction portion 811 can return the computed numbers n1 and n2 and a command reception report 821 to the host 101 (an example of a method of computation of n1 and n2 is described below).

The lock control portion 801, while receiving n1, n2, and the command reception report 821, can display n1 and n2 on a display screen of the host 101. Based on the displayed values n1 and n2, an operator of the host 101 can determine a value for input as the host setting parameter 822 having a configuration such as the example in FIG. 7B, and can input the determined value. The lock control portion 801 transmits the input value as the host setting parameter 822 described above to the storage system 200. The host setting parameter 822 has, for example, a prescribed number (for example 516) of CU allocation number fields. Each CU allocation number field corresponds to a prescribed CU (for example, the first CU allocation number field corresponds to the CU 301A). A CU allocation number field describes information as to whether a logical lock structure is to be generated, or the number of lock tables comprised by the logical lock structure. The host setting parameter 822 is information which depends on information written to the OP portion field 1822 in the previously transmitted host setting command 820. In other words, the interpretation by the lock construction portion 811 will differ depending on the information appearing in the OP portion field 1822. Specifically, when for example the information written to the OP portion field 1822 is "fixed allocation preparation", and when information indicating the value 10000 appears in the CU allocation number field, the lock construction portion 811 can interpret the command as a request for generation of a logical lock structure having a predetermined number (for example 16,000), or a computer number n2, described below, of lock tables. On the other hand, when the information written to the OP portion field 1822 is "variable allocation preparation", and when information indicating the value 10000 appears in the CU allocation number field, the lock construction portion 811 can interpret the command as a request for generation of a logical lock structure having 10,000 lock tables.

The lock construction portion 811, upon receiving a host setting parameter 822 (and in addition, upon receiving another host setting command 820 in which is described allocation execution), can perform re-construction processing of the logical lock structure group, based on the previously received host setting command 820 and the received host setting parameter 822 (S200). Specifically, the lock construction portion 811 can for example construct a logical lock structure 501 having a prescribed or specified number of lock tables for a specified CU, based on the contents of the host setting command 820 and host setting parameter 822. Further, the lock construction portion 811 can prepare, for each specified CU, a number of allocated lock tables 651 and a number of unused lock tables 653 and similar, can describe the number of lock tables 700 comprised by the logical lock structure 501 of the CU 301 in the number of allocated lock tables 651, and can describe the number of unused lock tables in the number of unused lock tables 653.

The lock control portion 801 issues a host read command 830 to the storage system 200. The lock construction portion 811, while receiving the host read command 830, transmits a command reception report 831 to the host 101.

Figure 7B:
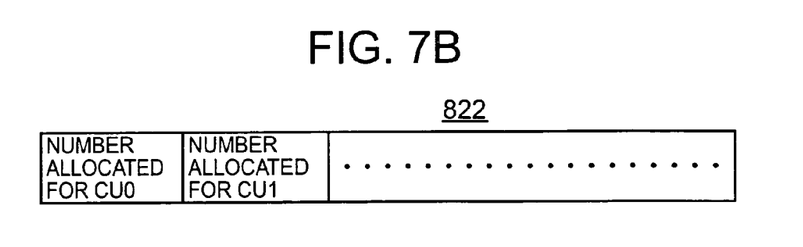
FIG. 7B shows an example of the configuration of a host setting parameter 822.
Figure 7C:
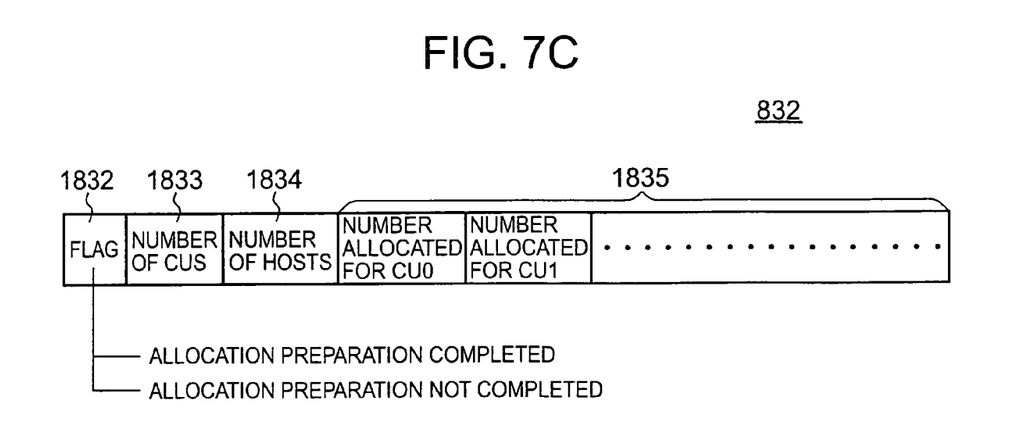
FIG. 7C shows an example of the configuration of command read data 832.

Next, the lock construction portion 811 transmits command read data 832, the configuration of an example of which appears in FIG. 7C, to the host 101. The command read data 832 is data indicating the configuration of the logical lock structure group 500 after re-construction processing. The command read data 832 comprises, for example, a flag field 1832, number of CUs field 1833, number of hosts field 1834, and extent field 1835. A flag (for example, "1" or "0") indicating whether or not allocation preparations are completed is set in the flag field 1832. Information indicating the number of CUs 301 comprised by the storage system 200 is provided in the number of CUs field 1833. Information indicating the number of hosts 101 connected to the storage system 200 is provided in the number of hosts field 1834. The extent field 1835 comprises a prescribed number of CU allocation number fields. Each CU allocation number field corresponds to a prescribed CU. The CU allocation number field corresponding to a certain CU provides information indicating the number of lock tables 700 comprised by the logical lock structure 501 corresponding to the CU.

The lock control portion 801 receives the command read data 832. If a flag indicating the completion of allocation preparation has been set in the flag field 1832 in the data 832, the lock control portion 801 can perform mutual recognition comparison processing (that is, confirmation of recognition between the host 101 and storage system 200) (S300). Specifically, for example, the lock control portion 801 can compare the contents of the previously transmitted host setting command 820 and host setting parameter 822 and the contents of the command read data 832, and can judge whether the two match. In other words, the lock control portion 801 can judge whether the configuration of the logical lock structure group 500 of its own request, and the configuration of the logical lock structure group 500 constructed according to the request, match. If the two do not match, the processing shown in FIG. 6 can be re-performed from the beginning (for example, from issuance of the host setting command 820). If the two match, the lock control portion 801 writes to the IPL file 650 the contents of the command read data 832, that is, the configuration of the logical lock structure group 500 after re-construction. The CPU 32 of the host 101 reads the IPL file 650 and performs processing. By this means, startup of the host 101 is completed.

Thereafter, the host 101 and storage system 200 are both in operation, and as explained referring to FIG. 5B, access exclusion control is performed based on the logical lock structure group 500 after re-construction processing.

Figure 6:
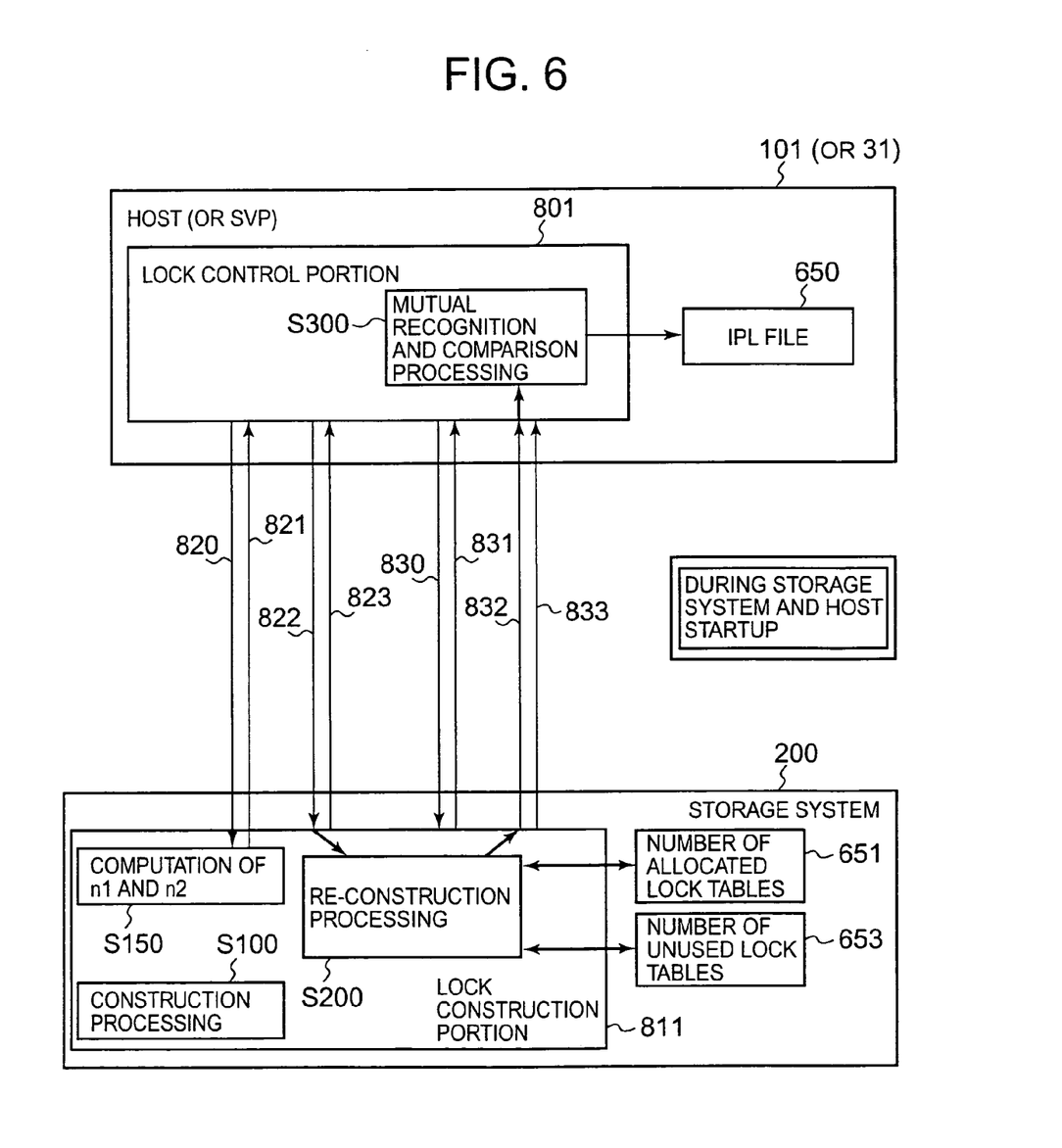
FIG. 6 shows an example of the flow of re-construction processing of a logical lock structure group.

Below, processing in the various stages of the processing flow shown in FIG. 6 is explained in greater detail.

When for example information written to the OP portion field 1822 of the host setting command 822 is fixed allocation preparation, the information provided in each of the CU allocation number fields in the host setting parameter 822 does not indicate the number of lock tables required by the CU 301 corresponding to that field, but is simply information indicating whether the CU requires a logical lock structure.

The lock construction portion 811 judges whether the number of CUs appearing in the number of CUs field 1823 of the host setting command 820 and the number of CUs requiring a logical lock structure appearing in the host setting parameter 822 match. Upon judging that the two do not match, the lock construction portion 811 can transmit to the host 101 information indicating that an improper condition has been detected, together with the command completion report 823. Upon judging that the two do match, the lock construction portion 811 can continue processing of the host setting command 820 and host setting parameter 822.

Further, in the construction processing of S100, the lock construction portion 811 constructed a lock table 600 capable of control of a prescribed number (for example 32) of hosts 101. However, in the case of this fixed allocation preparation, the lock construction portion 811 references the number of hosts field 1824, and if for example the number of hosts is given as 8, then an assumption of a lock table 700 capable of controlling 8 hosts can be made, and the number of lock tables which can be reserved can be computed.

By reducing the number of hosts which can be controlled from 32 to 8, the lock construction portion 811 can omit information relating to the unnecessary 24 hosts (for example, lock sub-status for 24 hosts) from each of the lock tables 600, and so can reduce the sizes of each of the lock tables.

Specifically, for example, if the storage capacity which can be used by the logical lock structure group is t, the information quantity not dependent on the number of hosts in one lock table is f, and the information quantity required for one host is h, then the total number of lock tables n0 which can be secured in the construction processing with initial settings (S100) can be computed using n0=TRUNC(t/(f+32 h)). In the case of this fixed allocation preparation, a number n1=TRUNC(t/(f+8 h)) can be secured. The relation between n0 and n1 is n0<n1. When the information quantity f not dependent on the number of hosts is extremely small, if the number of connected hosts is a fraction 1/N of the initial setting, then the number of lock tables which can be secured is substantially N times greater.

The lock construction portion 811 can use the new number of lock tables n1 and the value c appearing in the number of CUs field 1823 (for example, c≦512) to compute the number of lock tables n2 comprised by the logical lock structure for each CU 301 (for example, n2=1024×TRUNC(n1/c/1024)).

The lock control portion 801 accepts specifications from an operator as to which CUs among the plurality of CUs 301 require logical lock structures (by specifying, for example, the CU numbers). The lock control portion 801, upon receiving notification of n1 and n2, can generate a host setting parameter 822 into which are entered prescribed values in the CU allocation fields corresponding to the specified CUs, and can transmit the host setting parameter 822 to the storage system 200.

The lock construction portion 811 can prepare command read data 832 with prescribed timing (for example, upon notification of n1 and n2). In the case of this fixed allocation preparation, the number of CUs set according to the host setting command 820 is entered into the number of CUs field 1833, and the number of hosts appearing in the host setting command 820 is entered into the number of hosts field 1834.

When a flag indicating completion of allocation preparation is set in the received command read data 832, the lock control portion 801 can issue another host setting command 820, indicating allocation execution in the OP portion field 1822. At this time, the lock control portion 801 can set the respective prescribed values (for example, 0 (0×0000) and 0 (0×00)) in the number of CUs field 1823 and in the number of hosts field 1824.

The lock construction portion 811, upon receiving a host setting command indicating allocation preparation from the lock control portion 801, can execute allocation (that is, re-construction processing according to the fixed allocation preparation). The lock construction portion 811 can set the allocation results in the command read data 832, and can transmit the command read data 832. When a flag indicating completion of allocation preparation is set in this data 832, installation of the logical lock structure is completed.

The above is an explanation for a case in which the information written to the OP portion field 1822 of a host setting command 822 indicates fixed allocation preparation.

Cases in which the information written to the OP portion field 1822 of a host setting command 822 indicates variable allocation preparation differ from cases of fixed allocation preparation in for example the following respect.

Whether each of the CUs 301 requires a logical lock structure can be indicated, in the host setting parameter 822, by the number of lock tables comprised by the logical lock structure corresponding to the CU 301. That is, the lock control portion 801 can accept specifications of CUs (as for example CU numbers) which require logical lock structures, and for the specified CUs, specifications of the number of lock tables required. When these specifications are received, the lock control portion 801 can set 0 (0×00) in the CU allocation number field corresponding to a CU not requiring a logical lock structure, and can set the specified number of lock tables in the CU allocation number field of a CU requiring a logical lock structure.

Moreover, in for example allocation execution, the number of lock tables in a logical lock structure constructed in the storage system 200 can be the number set in the host setting parameter 822. That is, the number of lock tables in the host setting parameter 822 can be adjusted according to the frequency of access of each CU and similar.

The lock construction portion 811 can for example judge, from the total number of lock tables which can be secured in the storage system 200 (the number of lock tables in the logical lock structure group) n1, whether a certain specified CU allocation number (for example, the number allocated for CU0) can be secured. When it is judged that securing is possible, the CU allocation number for CU0 can be set in the command read data 832, this value can be subtracted from n1, and the value after subtraction can be stored in a prescribed storage area (for example, a prescribed work area). Next, the lock construction portion 811 can judge whether the allocation number for the specified CU1 can be secured. If it is judged that securing is possible, the lock construction portion 811 can set the allocation number for CU1 in the read command data 822, subtract this value from the above value after subtraction, and store the result. The lock construction portion 811 can repeat this processing. At this time, if it is judged that the specified number of lock tables cannot be secured, the lock construction portion 811 can set zero (for example, 0 (0×00)) as the allocation number for a CU for which securing is not possible, set allocation preparation completion in the flag field 1832, and finalize the command read data 832.

The above is an explanation of a case in which information written in the OP portion field 1822 of a host setting command 822 indicates variable allocation preparation.

When the information written in the OP portion field 1822 of a host setting command 822 indicates initial allocation preparation, the lock construction portion 811 can return a logical lock structure group 500 subjected to re-construction processing to the logical lock structure group 400 which is to be constructed based on the initial settings.

During operation of the hosts 101 and storage system 200, access exclusion control is performed as described above. During this time, lock tables 700 are dynamically put into the unused state and put into the used state. In this case, each time that for example the access control portion 812 puts a lock table for a certain CU 301 into the used state or releases the lock table, the number indicating the number of unused lock tables 653 corresponding to the CU 301 can be increased or decreased.

Further, the access control portion 812 can for example compare the value of the minimum unused number (the initial value of which is for example the same as the initial number of unused lock tables 653) 655 with the value of the number of unused lock tables after updating 653, at the time the number of unused lock tables 653 decreases. In this case, when the number is smaller than the value of the number of unused lock tables after updating 653, the access control portion 812 can write the value of the number of unused lock tables after updating 653 to the minimum unused number 655. As a result, the number of unused lock tables after updating 653 can be stored to the minimum unused number 655. When for example a host setting command 820 with minimum value preparation written in the OP portion field 1822 is transmitted from a host 101 or the SVP 31 to the storage system 200, the minimum unused number 655 for each CU 301 is returned from the storage system 200 to the host 101 or SVP 31.

In the storage system 200, the number of unused lock tables 653 is monitored. Below, processing to monitor the number of unused lock tables 653 is explained, referring to FIG. 8.

Figure 8:
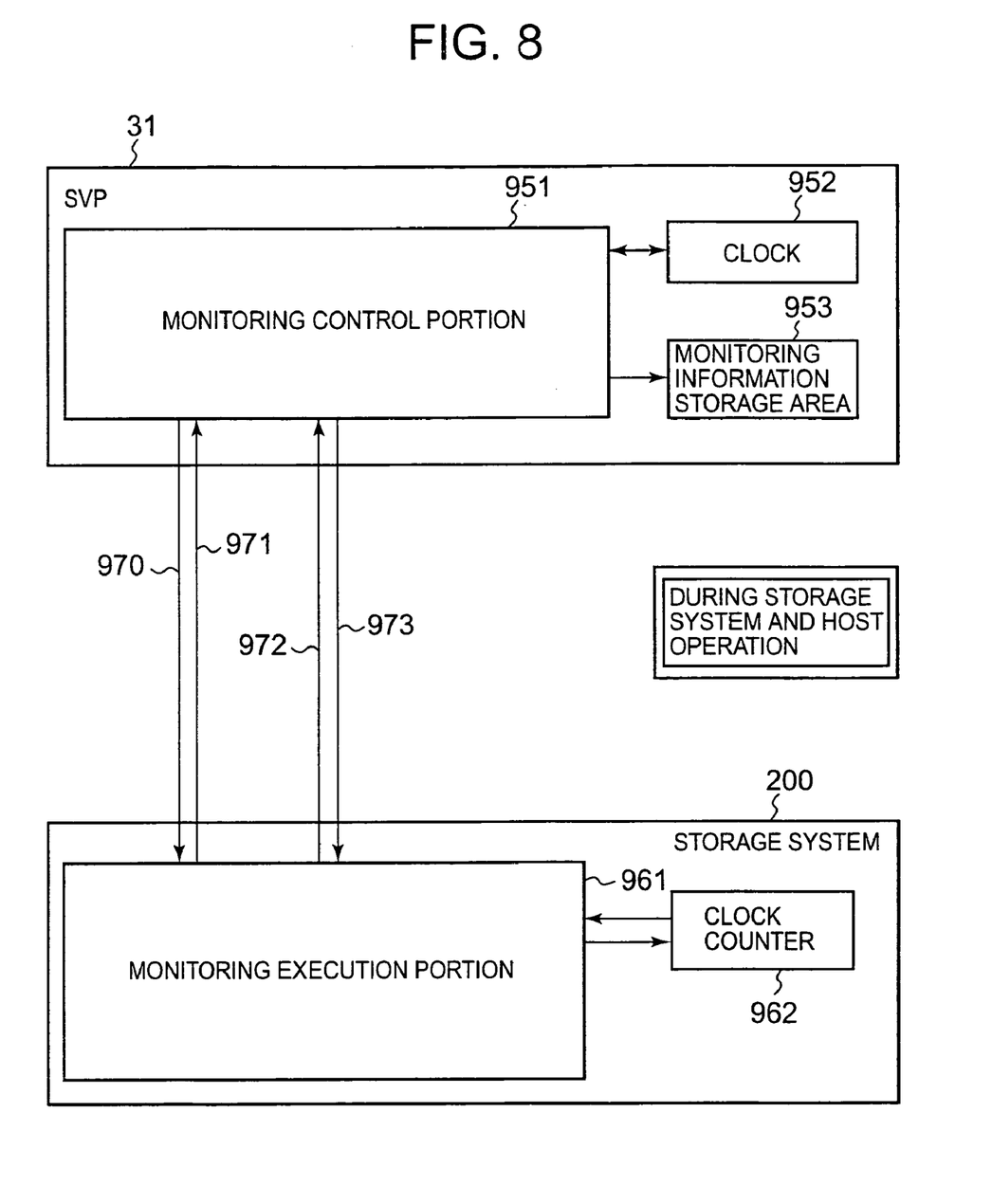
FIG. 8 explains an example of processing to monitor an unused lock table number 653.

For example, the SVP 31 (and/or host 101) may be provided with a monitoring control portion 951. The monitoring control portion 951 is for example a computer program which is read into and executed by the CPU in the SVP 31.

Further, the storage system 200 comprises a monitoring execution portion 961 which can perform monitoring of the number of unused lock tables in the logical lock structures 501 of each CU 301. The monitoring execution portion 961 is for example a computer program which is read into and executed by the CPU 13 of the CHA 7.

For example, when the storage system 200 and hosts 101 are operating, the monitoring control portion 951 is started within the SVP 31 as a result of an instruction by an operator of the SVP 31 (for example, maintenance personnel). For example, when startup of the monitoring control portion 951 is completed, a monitoring startup instruction 970, and more specifically, for example, a host setting command 970 in the OP portion field 1822 of which is written monitoring preparation, can be transmitted to the storage system 200.

The monitoring execution portion 961 of the storage system 200, while receiving the instruction 970, transmits a reception report 971 to the SVP 31. The lock execution portion 961 reads the number of unused lock tables 653 for each CU 301, and transmits the read number of unused lock tables 653 to the SVP 31, as indicated by the arrow 972. Thereafter, the processing of (A) and (B) below is repeated.

(A) The monitoring control portion 951, upon receiving the number of unused lock tables 653, can acquire information related to the time from the clock 952, and can write this time and the number of unused lock tables 653 as a set in the monitoring information storage area 953. The monitoring control portion 951 can then transmit a reception report 973 to the storage system 200.

(B) The monitoring execution portion 961, upon receiving a reception report 973, can read the clock counter 962, store the read-out count value in a prescribed storage area, and temporarily end processing. Thereafter, the monitoring execution portion 961 is started periodically in the storage system 200. Upon starting, the monitoring execution portion 961 reads the count value of the clock counter 962, and judges whether the difference with the stored counter value is equivalent to the difference representing the lapse of a fixed amount of time, such as for example 10 minutes. If the counter value differences are less than the fixed time difference, the monitoring execution portion 961 again enters sleep mode, but otherwise the number of unused lock tables 653 is read for each CU 301, and the read-out numbers of unused lock tables 653 are transmitted to the SVP 31.

The SVP 31 can display to maintenance personnel a list of a plurality of sets (sets of times and the numbers of unused lock tables 653 for each CU) recorded in the monitoring information storage area 953. The maintenance personnel can recognize the current state of the logical lock structure from the displayed information, and can judge what improvements it is desirable to make to the logical lock structure group configuration (specifically, what kind of host setting command 820 and parameter 822 it is desirable to transmit upon startup of hosts 101 (at IPL)).

The minimum unused numbers 655 for each CU, returned to the SVP 31, may be stored in the monitoring information storage area 953, and may be displayed to maintenance personnel, either together with the above list of sets, or separately. The maintenance personnel may judge, from the minimum unused numbers 655 displayed for each CU, how to improve the configuration of the logical lock structure group.

Further, the SVP 31 may acquire the number of allocated lock tables 651 for each CU, and may display CU numbers and values indicating the numbers of allocated lock tables 651 (that is, the number of lock tables comprised by the logical lock structure corresponding to the CU with the CU number) in a list. Maintenance personnel can then judge how to improve the configuration of the logical lock structure group, based on the displayed list, the above list of the plurality of sets, and the minimum unused numbers 655 for each CU.

The above has been an explanation of one aspect.

According to the above-described aspect, a lock control portion 801 is installed as a control program which issues requests to a host 101 or to the SVP 31 to change the configuration of the logical lock structure group, and a lock construction portion 811 is installed in the storage system 200 as a control program which analyzes such requests and modifies the configuration of the logical lock structure group according to the requests. The lock control portion 801 accepts input of various information, describing each of the fields 1822, 1823 and 1824 of host setting commands 820 and host setting parameters 822, from an operator of the host 101 or SVP 31. The lock control portion 801 transmits host setting commands 820 and host setting parameters 822, describing input information, to the storage system 200. The lock construction portion 811 receives host setting commands 820 and host setting parameters 822, and can control how logical lock structures are constructed, using how many lock tables and for which CUs, according to the contents of the commands 820 and parameters 822. By this means, logical lock structures which are not used at all can be eliminated, so that limited storage resources can be utilized effectively.

Further, according to the above aspect, the SVP 31 obtains information on changes with time in the number of unused lock tables 653 for each CU during operation of the storage system 200. The SVP 31 also obtains a minimum value 655 for the number of unused lock tables 653 for each CU, and the current configuration of the logical lock structure group. The various obtained information is displayed on the screen of the SVP 31. Maintenance personnel can judge how to improve the configuration of the logical lock structure group based on the various displayed information.

According to the above-described aspect, lock tables are not assigned in advance to all the records existing in a CU; rather, a logical lock structure is configured with a number of lock tables smaller than the number of existing CUs, and each lock table is dynamically allocated to and released from a record. Hence the size of the logical lock structure can be reduced.

According to the above-described aspect, in the case of fixed allocation preparation, when for example a number of CUs smaller than the number of CUs comprised by the storage system 200 are specified as CUs requiring logical lock structures, even if for example the number of hosts is the same compared with initial allocation preparation, the number of lock tables comprised by one logical lock structure can be increased. And in the case of variable allocation preparation, the number of lock tables in each logical lock structure can be adjusted based on for example CU sizes and the frequency of CU access, and similar.

In the above, one preferred aspect of this invention has been explained; however, this is an example used to explain the invention, and the scope of the invention is not limited to this aspect. This invention can be implemented with various modifications.

For example, the lock control portion can accept instructions for re-construction processing (for example, input of information describing a host setting command 820 and host setting parameter 822) from an operator of a host 101 or of the SVP 31 even while the host 101 and storage system 200 are operating. In this case, because the host 101 and storage system 200 are already in operation, the lock control portion 801 can notify the operator, through display on the screen of the host 101 or SVP 31, of the performance of re-construction processing based on the currently input information the next time the host 101 and storage system 200 are started, or, when there is a need to perform re-construction processing immediately, of restarting of the host 101 and storage system 200.

Further, the storage system 200 may for example store the configuration of the logical lock structure group immediately before the previous re-construction (for example, what logical lock structures were constructed for which CUs). In this case, upon startup of the storage system 200, the lock construction portion 811 may construct the logical lock structure group based on the configuration immediately preceding.

Further, the number of hosts capable of access may for example be different for each CU. In this case, the sizes of the lock tables in logical lock structures may be different for each CU.

What is claimed is:

1. A storage system, connected to a plurality of host computers, comprising:
    a plurality of storage device groups having storage areas, comprising a plurality of storage area units;
    a control block group, used to control exclusion of access to each of the storage area units by the plurality of host computers;
    storage resources configured to store the control blocks; and
    a controller, which executes the exclusion control using the control block group,
    wherein each of the plurality of storage device groups comprises one or more storage devices,
    the control block group comprises one or more control blocks,
    each control block corresponds to one among the plurality of storage device groups, and has a plurality of control sub-blocks to perform access exclusion control for one storage area unit,
    the controller ascertains the number of host computers which is the number of host computers actually able to access the same storage area units and/or the number of groups which is the number of storage device groups among the plurality of storage device groups for which the exclusion control is necessary, and based on the ascertained number of host computers and/or number of groups, constructs the control block group, the controller has a control interface which accepts, from at least one host computer among the plurality of host computers or from another computer machine connected to the storage system, input of the number of host computers and/or of the number of groups, and, by accepting input of the number of host computers and/or of the number of groups from the control interface, ascertains the number of host computers and/or the number of groups, the sizes of the control sub-blocks are larger when the number of host computers for which access exclusion control is performed using the control sub-blocks is greater, and the controller computes the number of the control sub-blocks which can be stored in an area based on the ascertained number of host computers and the size of the area for storage of the control block group in the storage resources, and notifies the host computer and/or said another computer machine of the computed number.

2. The storage system according to claim 1, wherein the controller ascertains which storage device groups require the exclusion control, and during construction of the control block group, equalizes the numbers of control sub-blocks comprising control blocks corresponding to each of the ascertained storage device groups.

3. The storage system according to claim 1, wherein the controller ascertains for which storage device groups the exclusion control should be performed and how many control sub-blocks should be allocated to which storage device groups, and during construction of the control block group, the controller configures control blocks corresponding to each of the ascertained storage device groups with the ascertained numbers of control sub-blocks.

4. The storage system according to claim 1, wherein the controller, upon receiving an access request for a certain storage area unit in a certain storage device group, searches among control blocks corresponding to the storage device group for a control sub-block in an unused state, sets a retrieved control sub-block into a used state, and when the access request processing is completed, returns the control sub-block to the unused state, ascertains the block usage circumstances, which are the number of control sub-blocks in the unused state in each control block, and notifies the host computer or said another computer machine of the ascertained block usage circumstances.

5. The storage system according to claim 1, wherein each of sub-blocks is constructed based on the ascertained number of the host computers actually able to access the same storage area units, which is smaller than among a total number of the plurality of host computers.

6. The storage system according to claim 1, wherein a number of control blocks constructed in the control block group is equal to the number of the storage device groups which require the exclusion control, which is smaller than a total number of the storage device groups.

7. The storage system according to claim 1, wherein the controller dynamically allocates and releases the sub-blocks.

8. The storage system according to claim 1, wherein the controller allocates a sub-block in response to a lock request from one of the host computers to access a corresponding storage area unit, and releases the sub-block after accessing to the storage area unit ends.

9. The storage system according to claim 5, wherein a logical lock structure of a control block is configured with a number of sub-blocks smaller than a number of storage area units in a corresponding storage device group.

10. The storage system according to claim 1, wherein information on changes with time in a number of unused sub-blocks for each storage device group during operation of the storage system is collected, and said information includes a minimum value for the number of unused lock tables for said each storage device group.

11. The storage system according to claim 10, wherein said information on changes and a current configuration of the control block group are displayed.

12. A storage system, connected to a plurality of host computers, comprising:

a plurality of storage device groups having storage areas, comprising a plurality of storage area units;

a control block group, used to control exclusion of access to each of the storage area units by the plurality of host computers;

storage resources configured to store the control blocks; and a controller, which executes the exclusion control using the control block group, wherein each of the plurality of storage device groups comprises one or more storage devices, the control block group comprises one or more control blocks, each control block corresponds to one among the plurality of storage device groups, and has a plurality of control sub-blocks to perform access exclusion control for one storage area unit, the controller ascertains the number of host computers which is the number of host computers actually able to access the same storage area units and/or the number of groups which is the number of storage device groups among the plurality of storage device groups for which the exclusion control is necessary, and based on the ascertained number of host computers and/or number of groups, constructs the control block group, the controller has a control interface which accepts, from at least one host computer among the plurality of host computers or from another computer machine connected to the storage system, input of the number of host computers and/or of the number of groups, and, by accepting input of the number of host computers and/or of the number of groups from the control interface, ascertains the number of host computers and/or the number of groups, the sizes of the control sub-blocks are larger when the number of host computers for which access exclusion control is performed using the control sub-blocks is greater, and the controller computes a first number of the control sub-blocks which can be stored in an area based on the ascertained number of host computers and the size of the area for storage of the control block group in the storage resources, computes a second number of control sub-blocks comprising the control blocks corresponding to each storage device group for which the exclusion control must be performed, based on the computed first number and the ascertained number of groups, and notifies the host computer and/or said another computer machine of the computed second number.

13. A storage control method for a storage system connected to a plurality of host computers, the storage system comprising: a plurality of storage device groups having storage areas, comprising a plurality of storage area units; a control block group configured to control exclusion of access to each of the storage area units by the plurality of host computers; and storage resources configured to store a plurality of control blocks, each of the plurality of storage device groups comprising one or more storage devices; the control block group comprising one or more control blocks, said method comprising:

corresponding each control block to one of the plurality of storage device groups, and configuring said each control block to have a plurality of control sub-blocks each performing access exclusion control for one storage area unit;

ascertaining a number of host computers among the plurality of host computers actually able to access the same storage area units and a number of storage device groups among the plurality of storage device groups for which exclusion control is required by accepting, from at least one host computer among the plurality of host computers or from another computer machine connected to the storage system, input of the number of host computers and/or the number of storage device groups;

constructing the control block group based on the ascertained numbers of host computers and storage device groups by computing the number of the control sub-blocks which can be stored in an area based on the ascertained number of host computers and the size of the area for storage of the control block group in the storage resources, the sizes of the control sub-blocks being larger when the number of host computers for which access exclusion control is performed using the control sub-blocks becoming greater;

notifying the host computers and/or said another computer machine of the computed number; and     executing the exclusion control using the constructed control block group.

14. A storage control method for a storage system connected to a plurality of host computers, the storage system comprising: a plurality of storage device groups having storage areas, comprising a plurality of storage area units; a control block group configured to control exclusion of access to each of the storage area units by the plurality of host computers; and storage resources configured to store a plurality of control blocks, each of the plurality of storage device groups comprising one or more storage devices; the control block group comprising one or more control blocks, said method comprising:

corresponding each control block to one of the plurality of storage device groups, and configuring said each control block to have a plurality of control sub-blocks each performing access exclusion control for one storage area unit;

ascertaining a number of host computers among the plurality of host computers actually able to access the same storage area units and a number of storage device groups among the plurality of storage device groups for which exclusion control is required by accepting, from at least one host computer among the plurality of host computers or from another computer machine connected to the storage system, input of the number of host computers and/or the number of storage device groups;

constructing the control block group based on the ascertained numbers of host computers and storage device groups by computing a first number of the control sub-blocks which can be stored in an area based on the ascertained number of host computers and the size of the area for storage of the control block group in the storage resources, and by computing a second number of control sub-blocks comprising the control blocks corresponding to each storage device group for which the exclusion control must be performed, based on the computed first number and the ascertained number of groups, the sizes of the control sub-blocks being larger when the number of host computers for which access exclusion control is performed using the control sub-blocks becoming greater;

notifying the host computers and/or said another computer machine of the computed second number; and     executing the exclusion control using the constructed control block group.

\* \* \* \* \*